INVENTORS
Kenneth W. Young
James H. Flatt
BY
C. R. Meland
Their Attorney

United States Patent Office 2,986,125
Patented May 30, 1961

2,986,125

VACUUM MOTOR

Kenneth W. Young and James H. Flatt, Anderson, Ind., assignors to General Motors Corporation, Detroit, Mich., a corporation of Delaware Filed July 30, 1959, Ser. No. 830,497

12 Claims. (Cl. 121—41)

This invention relates to vacuum motors and more particularly to a vacuum motor which is operative to actuate a movable device such as the ventilating dampers of a motor vehicle to a plurality of positions.

One of the objects of this invention is to provide a vacuum motor that is effective to actuate a movable member to a plurality of positions and which is simple in construction and fool-proof in operation.

Another object of this invention is to provide a vacuum motor that has a piston slidable in a cylinder, the piston carrying a valve that controls the connection of opposite sides of the piston with vacuum and with atmosphere respectively.

A more specific object of this invention is to provide a vacuum motor that includes a piston assembly formed of two members, there being a valve member clamped between the two members which controls the connection of atmosphere and vacuum to opposite sides of the piston and wherein the valve member is actuated by unbalanced air pressure on opposite sides of the piston.

Another object of this invention is to provide a vacuum motor including a cylinder that has a plurality of axially spaced passages that may be selectively connected with vacuum, there being a piston slidable within the cylinder which covers the individual passages during its movement and wherein the piston carries a valve member that controls the connection of vacuum and atmosphere with opposite sides of the piston.

Still another object of this invention is to provide a vacuum motor including a cylinder formed with a plurality of axially spaced passages that may be individually connected to a vacuum source and wherein the vacuum motor has a piston formed with a chamber that is connected to atmosphere through a hollow piston rod, the piston chamber being fitted with a diaphragm type valve which is shifted by unbalanced air pressure to connect one side of the piston with vacuum.

A further object of this invention is to provide a damper control system for a motor vehicle ventilating system wherein the damper that controls the admission of fresh air to the vehicle is actuated by a vacuum motor having at least three positions of adjustment.

Further objects and advantages of the present invention will be apparent from the following description, reference being had to the accompanying drawings wherein preferred embodiments of the present invention are clearly shown.

Figure 2:
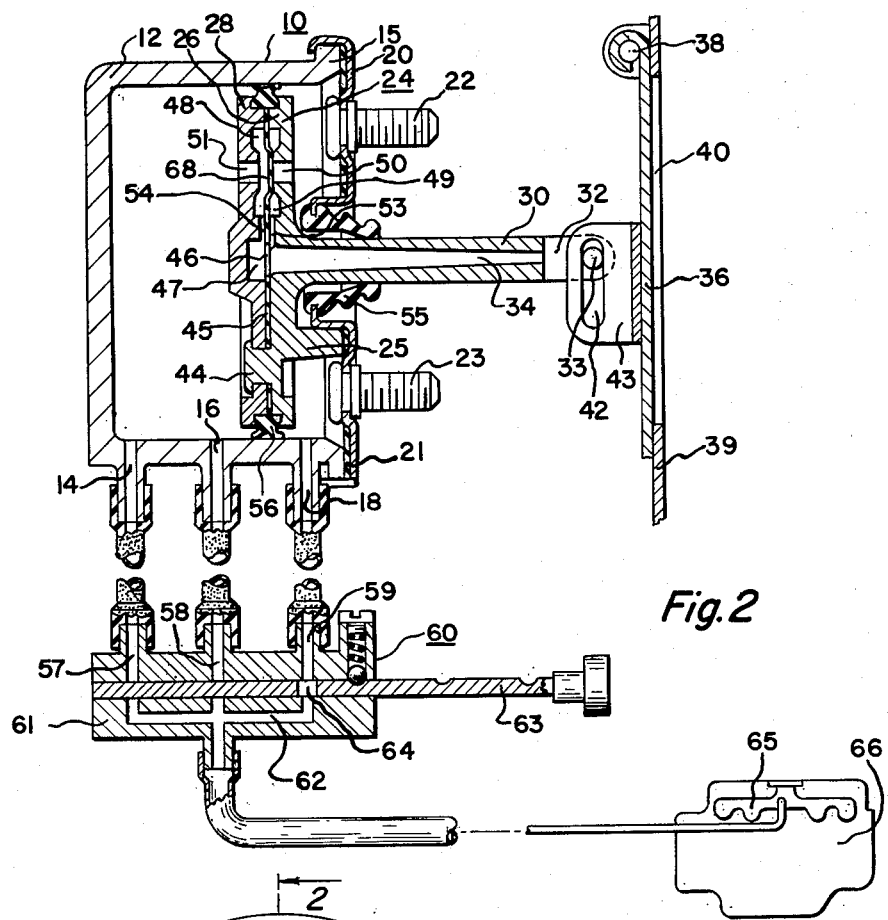
Figure 2 is a sectional view take along line 2—2 of Figure 1 and showing the connection of the vacuum motor with a ventilating damper.
Figure 1:
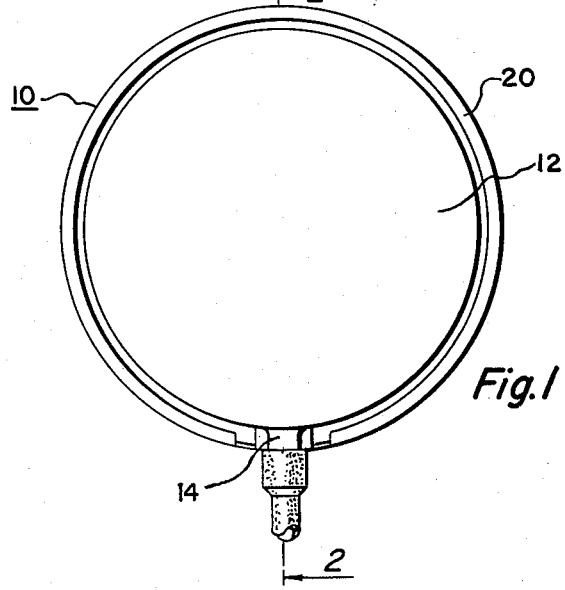
Figure 1 is an end view of a vacuum motor made in accordance with this invention.

Referring now to the drawings and more particularly to Figures 1 and 2, it is seen that the vacuum motor has a cylinder generally designated by reference numeral 10. The cylinder includes a casting designated by reference numeral 12 which is formed of suitable metal material and which has three axially spaced ports designated by reference numerals 14, 16 and 18. The vacuum motor cylinder includes an end plate designated by reference numeral 20 which is formed of suitable sheet metal material and which is crimped over a flanged portion 15 of casting 12. A gasket formed of rubber or the like and designated by reference numeral 21 is interposed between the sheet metal member 20 and the case 12 of the cylinder. A pair of mounting screws designated by reference numerals 22 and 23 are supported by the sheet metal member 20 and are adapted to operate as mounting screws or bolts for the vacuum motor.

Figure 3:
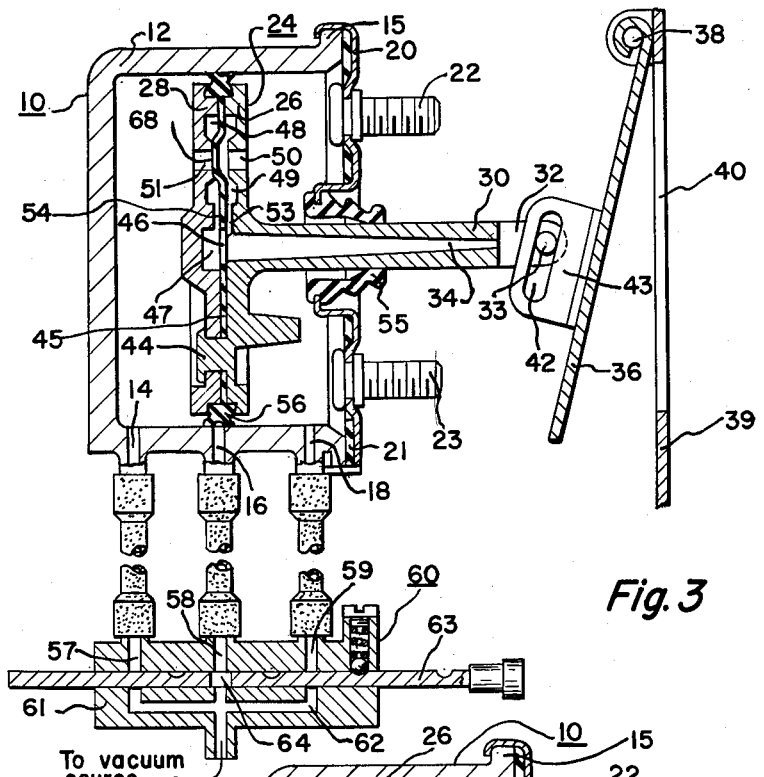
Figure 3 is a view similar to Figure 2 but illustrating the vacuum motor shifted to another position.
Figure 4:
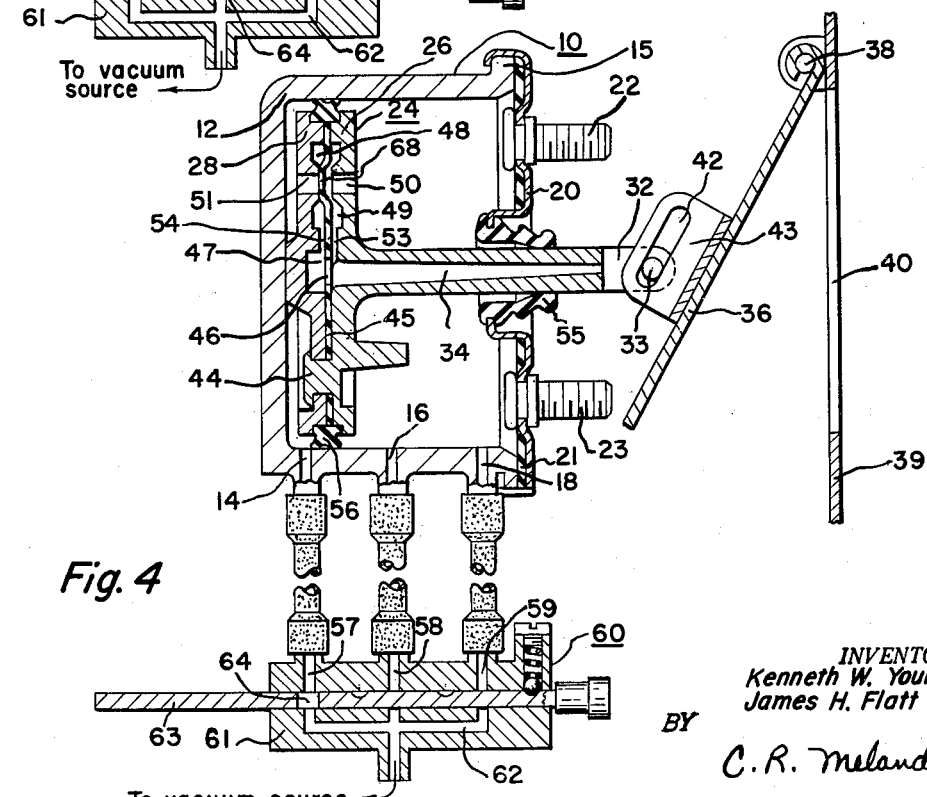
Figure 4 is a view similar to Figures 2 and 3 but illustrating the piston of the vacuum motor shifted to still another position.

The piston of the vacuum motor is designated in its entirety by reference numeral 24. This piston, or piston assembly, comprises a piston member generally designated by reference numeral 26 that may be formed of die cast zinc or the like and another piston member designated by reference numeral 28 which likewise may be formed of die cast zinc or the like. It is seen that the piston member 26 has a rod portion designated by reference numeral 30 which has a forked end 32. The rod 30 has a passage designated by reference numeral 34 which is open to atmosphere at the right end thereof. A pin 33, carried by forked end 32, actuates a ventilating damper designated by reference numeral 36 and pivoted to a support pin designated by reference numeral 38. The damper controls the admission of air through a passage formed in plate 39 and designated by reference numeral 40. The right side of the plate may be considered to be connected to a point exterior of the passenger compartment of a motor vehicle and the left side thereof may be considered to be connected to the passenger compartment of a motor vehicle. The pin 33 operates in a slot designated by reference numeral 42 formed in a bracket 43 that is connected to the damper 36. As can be seen in Figures 3 and 4, when the piston moves leftwardly in the cylinder, the damper 36 is moved to various positions to control the admission of fresh air to the passenger compartment of a motor vehicle.

The piston member 26 is formed with three rivet extensions designated by reference numeral 44, one of which is illustrated in Figure 3. These rivet extensions pass through openings in the piston member 28 and are headed over to secure the two piston members together. A flexible valve member designated by reference numeral 45 is clamped between the piston members 26 and 28 as is clearly apparent in Figure 2. This valve member may be formed of any suitable flexible material such as rubber. The valve member 45 has a central passage 46 which is in alignment with the passage 34 formed in piston rod 30. This passage is also in alignment with a chamber designated by reference numeral 47 which is formed in the piston member 28. The piston members 26 and 28 have complementary recesses which form chambers 48 and 49. In addition, these piston members are formed with axially extending passages 50 and 51 which are in alignment with each other. It can be seen that chambers 48 and 49, together with the area between the inner ends of passages 50 and 51 might be considered a single chamber in communication with opposite sides of the piston 24 through passages 50 and 51. The piston members 26 and 28 have recessed portions forming restricted channels 53 and 54 located at opposite sides of the valve member 45 and connecting chamber 47 with chamber 48 and also connecting the passage 34 with the chamber 49. It is seen that the flexible valve member 45 also divides the chambers 48 and 49 and is positioned between the passages 50 and 51.

The piston rod 30 slides within a resilient grommet designated by reference numeral 55 which is positioned between the sheet metal portion 20 of the cylinder and the piston rod. A lip seal formed of resilient material such as rubber and designated by reference numeral 56 is positioned between the outer circumferential edge of piston members 26 and 28 and the cylinder member 12.

The ports 14, 16 and 18 of the vacuum motor are connected respectively with ports 57, 58 and 59 of a valve member generally designated by reference numeral 60 and including the valve block 61. The ports 57, 58 and 59 are connected alternately with a passage 62 through an opening or passage 64 formed in a shiftable valve member 63. Passage 62 is connected with a vacuum source such as the intake manifold 65 of an internal combustion engine designated by reference numeral 66. In the position of the valve illustrated in Figure 2, the port 59 of the valve member and, thus, the port 18 of the vacuum motor cylinder, are connected with vacuum while the ports 57 and 58 are blocked as shown. The valve member may be shifted to a position wherein port 58 is connected to the vacuum source and ports 57 and 59 will be blocked and may be shifted to a position wherein the port 57 is connected to vacuum while the ports 58 and 59 are blocked. It will be appreciated that the valve 60 might take other constructions or configurations, it only being necessary that it connect one of the ports 14, 16 or 18 to a vacuum while the other two ports are blocked.

Assuming now that the valve is in the position illustrated in Figure 2, the ports 59 and 18 are connected to vacuum and the portion 68 of the diaphragm-type valve 45 will be pulled into contact with the piston member 26 to cover the port or passage 50. In this condition of operation, the right-hand side of piston 24 will be connected to vacuum through port 18 whereas the left-hand side of the piston will be connected to atmosphere via passage 34, chamber 47, restricted channel 54, the left-hand chamber 48 and the passage 51. It will be apparent that the differential pressure on opposite sides of the piston will cause the portion 25 of the piston to be held in tight engagement with the sheet metal part 20 of the cylinder. In this position, of the vacuum motor, the ventilating damper 36 is caused to close off the passage 40 so that fresh air cannot be admitted to the interior of the passenger compartment of the motor vehicle.

If the valve member 63 is now manually shifted to the position illustrated in Figure 3, the ports 16 and 58 are connected with vacuum causing the portion 68 of the diaphragm valve member 45 to shift into engagement with piston member 28 and close off the passage 51. This shifting will occur because vacuum is now operating through passage 51 on a relatively large area of the diaphragm as compared to the vacuum that operates through passage 50 over a relatively small area of the diaphragm. When the diaphragm shifts to cover passage 51, the entire piston assembly is moved leftwardly until the seal 56 covers the port 16. During this movement leftwardly, the right-hand side of the piston is connected to atmosphere via passage 34, the restricted channel 53, the right-hand side of chamber 49 and through passage 50. Once the piston member overlies the port 16, the piston will remain in the position shown to open the damper 36 to a position intermediate its fully closed and fully open position.

When it is desired to move the damper 36 to its fully open position, the valve member 63 is shifted to the position illustrated in Figure 4 to connect ports 14 and 57 with vacuum. This shifting of the valve member causes the portion 68 of diaphragm valve 45 to remain in a position covering the passage 51 and vacuum is therefore applied to the left-hand side of the piston whereas the right-hand side thereof is connected with atmosphere. The piston will move to and remain in the position illustrated in Figure 4 as long as the passage 14 is connected with vacuum and the ventilator damper 36 will be held in its fully opened position.

If the piston member is in the position illustrated in Figure 4 and it is desired to move the piston back to either of its positions illustrated in Figures 2 and 3, the valve is shifted to the correct position to cause this shifting. In going from the position illustrated in Figure 4 to the position illustrated in Figure 3, the portion 68 of the diaphragm valve 45 will shift from a position covering passage 51 to a position covering passage 50. Thus, if vacuum pressure is applied to port 16 through the valve 63, the piston assembly will move back to a position wherein it covers the port 16. If vacuum is applied to port 18, the piston will be moved back to its position of Figure 1 by shifting of the portion 68 of the valve member over the passage 50. It can be seen from the foregoing that the vacuum motor has step by step movement in either direction and, therefore, provides for a very convenient and accurate control of the damper 36. It will also be appreciated that the damper has its position controlled entirely by movement of the piston, there being no springs or other biasing devices that operate to impede the movement of the damper. It will also be appreciated that the piston may be moved the full length of its travel in either direction by manipulation of the valve member 63.

While the embodiments of the present invention as herein disclosed constitute preferred forms, it is to be understood that other forms might be adopted.

What is claimed is as follows:

1. A vacuum motor, comprising, a cylinder having a plurality of axially spaced ports that are adapted to be selectively connected with vacuum, a piston slidable within said cylinder having a chamber, means connecting said chamber with atmospheric pressure, a pair of passages connecting said chamber with opposite sides of said piston, and a flexible valve member having an outer peripheral edge secured to said piston and located within said chamber adapted to be distended by vacuum to a position wherein it covers one of said passages.

2. A vacuum motor, comprising, a cylinder having a plurality of axially spaced ports that are adapted to be selectively connected with vacuum, a piston slidable within said cylinder having a chamber that is connected with atmosphere through a piston rod, a valve member formed of distendable material carried by said piston and positioned within said chamber, and a pair of passages connecting opposite sides of said piston with said chamber, said valve member being distended into engagement with one of said passages when the side of said piston communicating with said passage is connected with vacuum through one of said cylinder ports.

3. A vacuum motor, comprising, a cylinder having a plurality of axially spaced ports that are adapted to be selectively connected with vacuum, a piston slidable within said cylinder formed of two members that are secured together and which define a chamber, one of said members having a piston rod formed with a passage that is connected with atmosphere, a flexible valve member formed of distendable material clamped between said two piston members and positioned within said chamber, and a passage located in each piston member and positioned on opposite sides of said valve member, said passages connecting opposite sides of said chamber with opposite sides of said piston.

4. A vacuum motor, comprising, a cylinder having a plurality of axially spaced ports that are adapted to be selectively connected with vacuum, a piston slidable within said cylinder having a chamber, passage means connecting said chamber with opposite sides of said piston, a flexible valve member formed of distendable material supported by said piston and positioned within said chamber between said passage means, and a pair of restricted channels defined by said valve member and internal walls of said piston connecting said chamber with atmospheric pressure.

5. A vacuum motor, comprising, a cylinder having a plurality of axially spaced ports that are adapted to be selectively connected with vacuum, a piston slidable within said cylinder formed of two piston members that are secured together, one of said piston members having an elongated piston rod that has a central passage connected with atmosphere, a flexible valve member formed of resilient material clamped between said piston members, a chamber formed by said piston members, a passage in each of said piston members connecting said chamber with opposite sides of said piston and positioned on opposite sides of said valve member, and restricted channel means formed by said valve member and internal walls of said piston members connecting the bore of said piston rod with said chamber.

6. In combination, a movable ventilating damper, a vacuum motor having a cylinder formed with a plurality of axially spaced ports, valve means for selectively connecting one of said ports with vacuum while blocking flow to the other of said ports, a piston slidable within said cylinder having a chamber that is connected with atmosphere, a pair of passages connecting said chamber with opposite sides of said piston, and a flexible valve member distendable into engagement with one or the other of said passages whereby one side of said piston is connected with atmosphere while the opposite side thereof is connected with vacuum through said valve means.

7. A vacuum motor, comprising, a cylinder formed of a cup-shaped member to which is attached a sheet metal end plate, a piston slidable within said cylinder formed of two piston members, one of which has an integral rod extending through said end plate, a plurality of axially spaced ports located within said cup-shaped member and spaced a distance greater than the axial dimension of said piston, a chamber formed by said piston members, passage means connecting opposite sides of said piston with said chamber, a flexible valve member clamped between said piston members and distendable from a position covering one of said passage means to a position covering the other of said passage means, and means including said piston rod for connecting said chamber with atmosphere.

8. A piston assembly for a vacuum motor, comprising, a pair of piston members one of which has projecting rivet portions that pass through openings in the other of said piston members and which are headed over to secure said piston members together, a chamber defined by said piston members, a passage in each of said piston members connecting said chamber with opposite sides of said piston member, a flexible valve member formed of distendable material clamped between said piston members and positioned intermediate said passages, said valve member being distendable to cover one or the other of said passages, one of said piston members having an elongated rod portion that is formed with a central bore, and means connecting said chamber and opposite sides of said flexible valve member with said bore.

9. A vacuum motor, comprising, a cylinder having a plurality of axially spaced ports that are adapted to be selectively connected with vacuum, a piston slidable within said cylinder having a chamber, passage means in said piston connecting opposite sides of said piston with said chamber, and a flexible valve member formed of distendable material positioned within said chamber in alignment with said passages, said valve member being distended into engagement with said piston to cover one or the other of said passages when one of said cylinder ports is connected with vacuum, and means for connecting the opposite side of said cylinder with atmosphere when said valve is shifted.

10. A vacuum motor comprising, a cylinder having a plurality of axially spaced ports that are adapted to be selectively connected with vacuum, a piston slidable within said cylinder having a chamber, passage means in said piston connecting opposite sides of said piston with said chamber, and a valve member formed of flexible material secured to said piston at its outer edge and dividing said chamber into a pair of sub-chambers each of which communicates with a respective passage means, atmospheric passage means adapted to connect with atmosphere, means connecting said atmospheric passage means with one of said sub-chambers, and means including an opening in said valve member connecting the other of said sub-chambers with said atmospheric passage means.

11. The vacuum motor according to claim 10 wherein the atmospheric passage means is formed in a piston rod connected with the piston.

12. A vacuum motor comprising, a cylinder having a plurality of axially spaced ports that are adapted to be selectively connected with vacuum, a piston comprised of two piston parts which are connected together and which define an internal chamber, said piston being slidable in said cylinder and having an axial dimension less than the distance between a pair of said axially spaced ports, a valve member formed of distendable material clamped between said piston parts and dividing said chamber into a pair of sub-chambers, passage means in said piston connecting a respective sub-chamber with a respective side of said piston, atmospheric passage means adapted to be connected with atmosphere, means connecting one of said sub-chambers with said atmospheric passage means including a passage defined by said valve member and an internal wall of one of said piston parts, and means connecting the other of said sub-chambers with said atmospheric passage means including an opening in said valve member and a passage defined by an internal wall of the other piston part and said valve member.

References Cited in the file of this patent

UNITED STATES PATENTS

| | | |
|---|---|---|
| 1,484,030 | Kitchen | Feb. 19, 1924 |
| 1,528,405 | Craig | Mar. 3, 1925 |
| 2,219,965 | Smitt | Oct. 29, 1940 |
| 2,262,233 | Hey | Nov. 11, 1941 |
| 2,642,848 | Walraven et al. | June 23, 1953 |
| 2,895,455 | Clowes | July 21, 1959 |